(12) United States Patent
Kang et al.

(10) Patent No.: US 10,749,221 B2
(45) Date of Patent: Aug. 18, 2020

(54) SECONDARY BATTERY CONTAINING AUXILIARY ELECTRODE SENSOR AND ANOMALY DETECTION METHOD FOR SECONDARY BATTERY

(71) Applicant: SEOUL NATIONAL UNIVERSITY R&DB FOUNDATION, Seoul (KR)

(72) Inventors: Ki-Suk Kang, Gwacheon-si (KR); Se-Hwan Moon, Hwaseong-si (KR); Gab-In Yoon, Seoul (KR); Hyeok-Jun Park, Seongnam-si (KR); Orapa Tamwattana, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 18 days.

(21) Appl. No.: 16/052,455

(22) Filed: Aug. 1, 2018

(65) Prior Publication Data

US 2019/0044196 A1 Feb. 7, 2019

(30) Foreign Application Priority Data

Aug. 2, 2017 (KR) .................. 10-2017-0098082

(51) Int. Cl.
| | |
|---|---|
| *H01M 10/48* | (2006.01) |
| *H01M 10/0525* | (2010.01) |
| *H01M 10/42* | (2006.01) |
| *H01M 4/62* | (2006.01) |
| *H01M 2/14* | (2006.01) |
| *H01M 4/583* | (2010.01) |
| *H01M 10/04* | (2006.01) |

(52) U.S. Cl.
CPC ............ *H01M 10/48* (2013.01); *H01M 2/14* (2013.01); *H01M 4/583* (2013.01); *H01M 4/628* (2013.01); *H01M 10/0445* (2013.01); *H01M 10/0525* (2013.01); *H01M 10/4235* (2013.01); *H01M 2200/00* (2013.01)

(58) Field of Classification Search
None
See application file for complete search history.

(56) References Cited

U.S. PATENT DOCUMENTS

| | | | |
|---|---|---|---|
| 2007/0018141 A1* | 1/2007 | Kepler | H01B 1/06 252/500 |
| 2016/0006081 A1* | 1/2016 | Eaglesham | H01M 4/58 429/50 |

FOREIGN PATENT DOCUMENTS

| | | |
|---|---|---|
| KR | 1020170001375 | 1/2017 |
| KR | 1020170044939 | 4/2017 |
| WO | WO2015031334 | 3/2015 |

OTHER PUBLICATIONS

Seoul National University Industry—University Collaboration, Notice of Allowance, KR 12007059242, dated Nov. 19, 2018. (Cited with the original document and a full text translation).

(Continued)

*Primary Examiner* — Karie O'Neill Apicella
(74) *Attorney, Agent, or Firm* — Heslin Rothenberg Farley & Mesiti P.C.; George Blasiak (57) ABSTRACT

A secondary battery including, an anode including a metal; a cathode; an electrolyte provided between the anode and the cathode; and a separator membrane, and further comprising an auxiliary electrode interposed in the separator membrane, for inhibiting dendrite growth of the metal to a predetermined state or less and detecting an internal short circuit of the secondary battery in advance, is provided.

10 Claims, 7 Drawing Sheets

(56) References Cited

OTHER PUBLICATIONS

Lin, et al., "All-Integrated Bifunctional Separator for Li Dendrite Detection via Novel Solution Synthesis of a Thermostable Polyimide Separator," Journal of the American Chemical Society. 2016, 138, 11044-11050.

* cited by examiner

SECONDARY BATTERY CONTAINING AUXILIARY ELECTRODE SENSOR AND ANOMALY DETECTION METHOD FOR SECONDARY BATTERY

CROSS-REFERENCE TO RELATED APPLICATION

This application claims priority to Korean Patent Application No. 10-2017-0098082 filed on Aug. 2, 2017, and all the benefits accruing therefrom under 35 U.S.C. § 119, the contents of which is incorporated by reference in its entirety.

BACKGROUND OF THE INVENTION

(a) Field of the Invention

The present disclosure relates to a secondary battery containing an auxiliary electrode sensor and an anomaly detection method for a secondary battery. More particularly the present disclosure relates to a secondary battery and an anomaly detection method for a secondary battery that enables detection of an internal short circuit in advance and is capable of inhibiting dendrite growth of a negative electrode metal.

(b) Description of the Related Art

As an alternative to sustainable environmental issues, there is a growing interest and demand for high-capacity energy storage technologies such as electric vehicles. In order to realize such a high-capacity energy storage device, it is necessary to develop a secondary battery technology having a high energy density. The lithium-ion battery, which is known for being the highest technological level at present, consists of lithium-containing transition metal oxide and graphite as cathode and anode materials of the battery, respectively. Based on excellent energy storage and life characteristics, the lithium-ion battery is used as an energy source of portable or small-sized electronic devices.

However, despite the technical and commercial success of such lithium-ion batteries, the energy density of current lithium-ion batteries is inevitably insufficient to be applied to big batteries for high-capacity energy storage devices. Therefore, it is important to develop an electrode material or battery technology capable of exhibiting a higher energy density.

On the other hand, a lithium metal battery using a lithium metal as an anode such as a lithium-air or lithium-sulfur battery is proposed as a solution for a high-capacity battery.

As a related prior art, Korean Laid-Open Publication No. 10-2017-0068426 provides a lithium-air battery comprising: an anode including lithium; a cathode using oxygen as a positive active material; and an organic liquid electrolyte, wherein the organic liquid electrolyte comprises a transition metal-ligand complex, and the metal of the metal-ligand complex is at least one metal selected from the group consisting of titanium (Ti), vanadium (V), chromium (Cr), manganese (Mn), nickel (Ni), copper (Cu), niobium (Nb), molybdenum (Mo), ruthenium (Ru), tin (Sn), antimony (Sb), tungsten (W), platinum (Pt), silver (Ag), gold (Au), palladium (Pd), rhodium (Rh), and lead (Pb), and the ligand of the metal-ligand complex comprises at least one selected from the group consisting of a porphyrin ring, a cyclopentadiene ring, an indene ring, a pyridine ring, a carbazole ring, an imidazole ring, a pyrrole ring, a thiophene ring, a thianthrene ring, a furan ring, a pyran ring, an isobenzofuran ring, a pyrazole ring, an isothiazole ring, an isoxazole ring, a pyrazine ring, a pyrimidine ring, a pyridazine ring, a pyrrolizine ring, an indolizine ring, an isoindole ring, an indole ring, an indazole ring, a purine ring, a quinolizine ring, an isoquinoline ring, a quinoline ring, a phthalazine ring, a naphthyridin ring, a quinoxaline ring, a quinazoline ring, a cinnoline ring, a pteridine ring, a phenanthridine ring, an acridine ring, a perimidine ring, a phenanthroline ring, a phenazine ring, a phenothiazine ring, a phenoxazine ring, and derivatives thereof.

Lithium metal is an ideal anode material for lithium secondary batteries with a high energy density because it has the lowest electrochemical reduction potential and is the lightest metal element. In addition, compared with conventional graphite materials driven by insertion/extraction reactions of lithium ions, lithium metal has excellent output characteristics because it stores/converts energy through a simple dissolution/deposition process of lithium. However, the lithium metal has a problem of low coulombic efficiency and life due to reactivity with organic electrolyte in the battery. Especially, the use of the lithium metal is limited by the stability problem due to the formation of dendrite formed in the charging process.

Up until now, as a solution to the problem of lithium metal, introduction of a stable protective film on the surface of lithium metal has been regarded as a key technology. When a stable protective film is formed, it is possible to inhibit the continuous reaction between lithium metal and electrolyte, and it is also possible to secure stability of the battery by controlling the shape of the lithium metal upon charging. However, although such a physical/chemical protective film technique could increase the Coulomb efficiency and prolong the repetitive charge/discharge time, it could not completely inhibit the dendrite growth itself. In addition, when a high current density is applied, there is a tendency of its effect being halved, so the protective film technology developed so far still poses a potential risk of lithium dendrite growth.

SUMMARY OF THE INVENTION

The present disclosure is directed to providing a method of detecting the risk of dendrite growth of an anode metal in advance, by measuring a voltage between an auxiliary electrode and an anode provided between a cathode and the anode to eliminate the possibility of explosion of a battery through an internal short circuit, to provide a safe secondary battery.

According to an aspect of the present disclosure, a secondary battery is provided, the secondary battery including, an anode including a metal; a cathode; an electrolyte provided between the anode and the cathode; and a separator membrane, wherein an auxiliary electrode interposed in the separator membrane, for inhibiting dendrite growth of the metal to a predetermined state or less and detecting an internal short circuit of the secondary battery in advance, is further included. The material of the auxiliary electrode may be any material capable of accepting lithium ions while having a lithium chemical potential higher than that of lithium metal, and preferably a carbon-based electrode may be used.

In one embodiment, the separator membrane may be configured to have an auxiliary electrode interposed therein after the auxiliary electrode is formed by mixing a polymer and an auxiliary electrode material at a weight ratio in a range of 4:6 to 3:7.

In one embodiment, the separator membrane may be configured to have an auxiliary electrode interposed between a plurality of separator membrane layers that are spaced apart from each other.

In one embodiment, the anode may include one or more metals selected from a group consisting of lithium, sodium, potassium, magnesium, and zinc.

In one embodiment, the auxiliary electrode may include a variety of materials such as silicon, tin, carbon-based and the like. Particularly, among carbon-based materials, one or more selected from a group consisting of graphite, hard carbon, soft carbon, graphene, carbon nanotubes, active carbon, carbon black, carbon fiber, and fullerene may be included.

In one embodiment, the polymer may be one or more selected from a group consisting of poly(vinylidene fluoride-co-hexafluoropropylene) (PVDF-HFP), poly(vinylidene fluoride) (PVDF), polytetrafluoroethylene (PTFE), poly(methylmethacrylate) (PMMA), poly(acrylonitrile) (PAN), polyethylene (PE), and polypropylene (PP).

In one embodiment, the auxiliary electrode may inhibit the growth of the metal when dendrite of the metal grows and comes into contact with the auxiliary electrode.

In one embodiment, the auxiliary electrode may be configured to have the metal inserted into the auxiliary electrode when a dendrite of the metal grows and comes into contact with the auxiliary electrode.

In one embodiment, the secondary battery may be connected to the anode and the auxiliary electrode and may further include means for detecting a voltage between the anode and the auxiliary electrode.

According to another aspect of the present disclosure, a secondary battery anomaly detection method is provided, the method including, analyzing a state of the secondary battery, by using a means connected to the secondary battery, the anode, and auxiliary electrode for detecting a voltage between the anode and the auxiliary electrode, to collect data for voltage change between the anode and auxiliary battery when the secondary battery is driven to compare with preset data.

In one embodiment, when a voltage between the anode and auxiliary electrode is 0.01 V or less, the use of the secondary battery may be stopped.

According to an aspect of the present invention, the auxiliary electrode is provided between the cathode and the anode, thereby it is possible to discover the danger of the secondary battery before an internal short-circuit and the use of the battery is stopped to enable the safe use of the secondary battery.

In addition, unlike previously reported methods, when an electrode type material capable of storing metal ions is introduced, information on dendrite growth can be confirmed in real time through voltage, and metal ion storage in an auxiliary electrode is also possible and thus growth of dendrite can be prevented with an opposite electrode or the growth rate can be delayed.

Furthermore, unlike previously reported methods, an auxiliary electrode itself acts as a physical barrier, thereby preventing lithium dendrite growth.

Furthermore, even if metal ions are all intercalated in a carbon layer to form a charged phase when an auxiliary electrode using a carbon-based material is used, the deposition of the metal ions is carried out on the anode rather than on the carbon surface, and thus has an effect of inhibiting dendrite growth.

The above-described invention can be applied to all possible battery types using lithium metal as an anode. In particular, it is possible to apply to various high-capacity battery fields of the next generation such as a lithium-air or lithium-sulfur battery, and secondary batteries using a metal such as sodium, potassium, magnesium, zinc, or the like as an anode.

It should be understood that the effects of the present invention are not limited to the effects described above, but include all effects that can be deduced from the detailed description of the present disclosure or the constitution of the invention described in the claims.

DETAILED DESCRIPTION OF THE EMBODIMENTS

Hereinafter, preferred embodiments of the present disclosure will be described in detail with reference to the accompanying drawings.

The advantages and features of the present invention and the manner of accomplishing it will become apparent with reference to the embodiments described in detail below with reference to the accompanying drawings.

However, it is to be understood that the present invention is not limited to the disclosed embodiments, but may be embodied in many different forms and should not be construed as limited to the embodiments set forth herein. Rather, these embodiments are provided so that this disclosure will fully convey the scope of the invention to those skilled in the art, and the invention is only defined by the scope of the claims.

Further, when it is determined that related art or the like may obscure the gist of the present invention in describing the present invention, detailed description thereof will be omitted.

An aspect of the present disclosure provides a secondary battery, the secondary battery including, a an anode including a metal; a cathode; an electrolyte provided between the anode and the cathode; and a separator membrane, wherein an auxiliary electrode interposed in the separator membrane, for inhibiting dendrite growth of the metal to a predetermined state or less and detecting an internal short circuit of the secondary battery in advance, is further included.

A secondary battery according to an aspect of the present disclosure, the auxiliary electrode may be interposed after being formed by mixing a polymer and an auxiliary electrode material at a weight ratio in a range of 4:6 to 3:7. The auxiliary electrode may be interposed at the above-mentioned weight ratio between the plurality of separator membrane layers that are spaced apart from each other. If the weight ratio of the polymer to auxiliary electrode exceeds 40%, the auxiliary electrode is insufficient and thus the dendrite growth of an electrode metal cannot be sufficiently prevented or there is a risk of decrease in energy density. If the weight ratio of the polymer to auxiliary electrode is less than 30%, the storage capacity of lithium metal ions may be increased at the time the auxiliary electrode is in contact with dendrite of an anode, but this can cause a problem during the manufacturing of the auxiliary electrode in a sheet form.

The auxiliary electrode may be interposed between the plurality of separator membrane layers that are spaced apart from each other.

The polymer may be one or more selected from a group consisting of poly(vinylidene fluoride-co-hexafluoropropylene) (PVDF-HFP), poly(vinylidene fluoride) (PVDF), polytetrafluoroethylene (PTFE), poly(methylmethacrylate) (PMMA), poly(acrylonitrile) (PAN), polyethylene (PE), and polypropylene (PP), and preferably may include poly(vinylidene fluoride-co-hexafluoropropylene) (PVDF-HFP).

The auxiliary electrode may include a carbon-based material, silicon, tin and the like, and the carbon-based material may include one or more selected from a group consisting of graphite, hard carbon, soft carbon, graphene, carbon nanotubes, activated carbon, carbon black, carbon fiber, and fullerene, and preferably may include graphite.

The anode may include one or more metals selected from a group consisting of lithium, sodium, potassium, magnesium, and zinc, and preferably may include lithium, and it is preferable to include lithium.

The cathode may be made of a conductive material such as copper, aluminum or carbon having a difference in electric potential relative to the anode.

The anode and the cathode may be in a form of having a negative electrode active material and a positive electrode active material coated thereon.

When the anode contains lithium, the electrolyte may include one or more of lithium salt selected from a group consisting of lithium hexafluorophosphate (LiPF$_6$), lithium tetrafluoroborate (LiBF$_4$), lithium hexafluoroantimonate (LiSbF$_6$), lithium hexafluoroarsenate (LiAsF$_6$), lithium difluoromethane sulfonate (LiCoF$_4$SO$_3$), lithium perchlorate (LiClO4), lithium aluminate (LiAlO$_2$), lithium tetrachloroaluminate (LiAlCl$_4$), lithium chloride (LiCl), lithium iodide (LiI), lithium bisoxalato borate (LiB(C$_2$O$_4$)$_2$), and lithium trifluoromethanesulfonylimide (LiTFSI).

The electrolyte may include one or more organic solvents selected from a group consisting of ethylene carbonate (EC), propylene carbonate (PC), ethyl methyl carbonate (EMC), dimethyl carbonate (DMC), diethyl carbonate (DEC), fluoroethylene carbonate (FEC), methylpropyl carbonate (MPC), ethylpropyl carbonate (EPC), methyl ethyl carbonate (MEC), butylene carbonate (BC), ethyl acetate, methyl acetate, propyl acetate, ethyl propionate, methyl propionate, and propyl propionate.

A separator membrane having the auxiliary electrode interposed therein may be provided without being spaced apart respectfully from the anode and the cathode. It may be provided having a space of 10 to 100 μm therebetween, but the present disclosure is not limited thereto as long as an electrical short circuit can be sufficiently prevented.

When the secondary battery is driven, a dendrite of the anode metal may be grown and contacted with the auxiliary electrode. At this time, the growth of the metal is inhibited, and intercalation of the metal ions in the auxiliary electrode can be performed using the difference in lithium chemical potential between the metal and the auxiliary electrode materials as a driving force. Since the auxiliary electrode material has a property of being capable of storing metal ions by itself, the grown metal dendrite can no longer grow towards the opposite electrode (cathode) and can continuously cause the intercalation reaction into the auxiliary electrode. The thermodynamic energy of the auxiliary electrode changes according to the intercalation of the metal ions, and can be shown as a decrease in voltage.

The secondary battery may be electrically connected to the anode and auxiliary electrode, and may further include means for sensing a voltage between the two electrodes. When the dendrite of the anode metal grows and comes into contact with the auxiliary electrode, the voltage between the anode and the auxiliary electrode may be lowered from about 3.0 V to about 0.01 V as the metal ions are intercalated in the auxiliary electrode. When the voltage of the auxiliary electrode drops, the danger of the secondary battery caused by the dendrite growth of the anode metal can be detected, so that the secondary battery can be safely stopped before the internal short circuit occurs.

That is, the secondary battery according to an embodiment of the present disclosure can detect the growth of a metal dendrite while minimizing the loss of energy density a metal such as lithium has, and effectively inhibit further growth.

Most of the prior art focuses on the stabilization of the metal surface of an anode. However, the present disclosure detects the danger of the anode metal dendrite which grows inevitably before an internal short circuit occurs, rather than stabilizing the surface of the anode through surface modification. It has its specificity in that it can identify the risk of secondary battery explosion and stop the driving.

In addition, since the auxiliary electrode of the secondary battery according to an embodiment of the present disclosure can serve as storage capable of accommodating metal ions, it is possible to prevent the dendrite growth, which can grow continuously, in addition to the internal short circuit detection.

Figure 7:
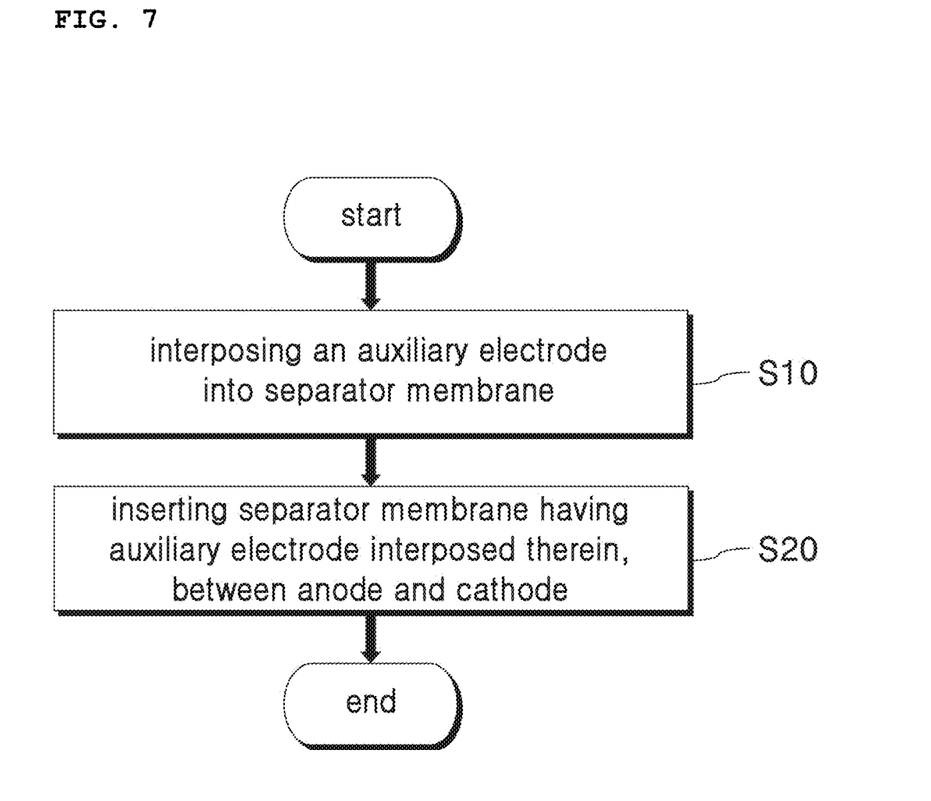
FIG. 7 is a schematic view showing an example of a method of manufacturing a secondary battery including an auxiliary electrode according to one embodiment of the present disclosure.

Another aspect of the present disclosure provides a secondary battery manufacturing method including, interposing an auxiliary electrode into a separator membrane (step 1) in step S10; and injecting an electrolyte (step 2) in step S20.

In the secondary battery manufacturing method according to an aspect of the present disclosure, the auxiliary electrode is interposed into the separator membrane in step 1 (S10).

In step 1, the auxiliary electrode may be manufactured in a sheet form by mixing a polymer and an auxiliary electrode material at a weight ratio in a range of 4:6 to 3:7 with a solvent, applying on a substrate and then heat treating.

In step 1, the solvent used for mixing may be one or more selected from a group consisted of N-methyl-2-pyrrolidone (NMP), acetone, ethanol, tetrahydrofuran (THF), dimethyl acetamide (DMAc), and toluene.

In step 1, an auxiliary electrode may be interposed between a plurality of separator membrane layers spaced apart from each other such that the polymer to auxiliary electrode ratio is in the same as the weight ratio as described above.

In step 1, the auxiliary electrodes mixed having the weight ratio as described above may be interposed between a plurality of separator membrane layers spaced apart from each other.

The material of the auxiliary electrode and the separator membrane in step 1 may be as described in the description of the secondary battery.

In the secondary battery manufacturing method according to an aspect of the present disclosure, a separator membrane having the auxiliary electrode interposed between an anode and a cathode is inserted between the two electrodes, and an electrolyte is injected in step 2 (S20).

In step 2, the thickness of the separator membrane having the auxiliary electrode interposed therein may be as mentioned in the description of the secondary battery.

The anode and cathode and the like of step 2 may be the same material as mentioned in the description of the secondary battery.

The insertion in the step 2 may be performed in a case, a container, or the like that can accommodate all of the cathode, anode, and the separator membrane having the auxiliary electrode interposed therein.

The electrolyte of step 2 may be a component as mentioned in the description of the secondary battery.

Another aspect of the present disclosure provides an anomaly detection method for a secondary battery, the method including, analyzing a state of the secondary battery, by using a means connected to the secondary battery, the cathode, and auxiliary electrode for detecting a voltage between the anode and the auxiliary electrode, to collect data for voltage change between the anode and auxiliary battery when the secondary battery is driven, and compare with predetermined data.

In the anomaly detection method for a secondary battery according to an aspect of the present disclosure, a voltage between the anode and auxiliary electrode may be 2.5 V to 4.0 V initially, relative to lithium. When the anode metal dendrite grows enough to come into contact with the auxiliary electrode as the secondary battery is driven, the voltage between the anode and auxiliary electrode may gradually decrease to reach 0.01 V, and at this time, it is preferable to stop the use of the secondary battery.

Hereinafter, the present disclosure is described in more detail using examples and experimental examples. However, the following examples and experimental examples are for illustrative purposes only, and the scope of the present disclosure is not limited thereto.

<Comparative Example 1> Preparation of Lithium Symmetric Cell

A lithium metal foil (Hohsen, Japan) having a thickness of 300 μm was used as electrodes of both sides; a carbon-based organic solution (a mix of: 1 M lithium hexafluorophosphate (LiPF$_6$), ethylene carbonate (EC) and dimethyl carbonate (DMC), Sigma-Aldrich) was used as electrolyte; and a polyvinylidene fluoride-hexafluoropropylene (PVDF-HFP) was used as a separator membrane to prepare a lithium symmetric cell.

<Example 1> Preparation of Lithium Symmetric Cell Including Auxiliary Electrode

Graphite powder synthetic (Alfa Aesar) and polyvinylidene fluoride-hexafluoropropylene (PVDF-HFP) were mixed in a weight ratio of 7:3 via N-methyl-2-pyrrolidone (NMP) solvent and then applied on a substrate to prepare a separator membrane having a carbon-based auxiliary electrode interposed therein in a sheet form. A lithium symmetric cell was prepared in the same manner as in Comparative Example 1, except that the separator membrane in which the carbon-based auxiliary electrode was interposed was used instead of the separator membrane of Comparative Example 1.

Figure 2:
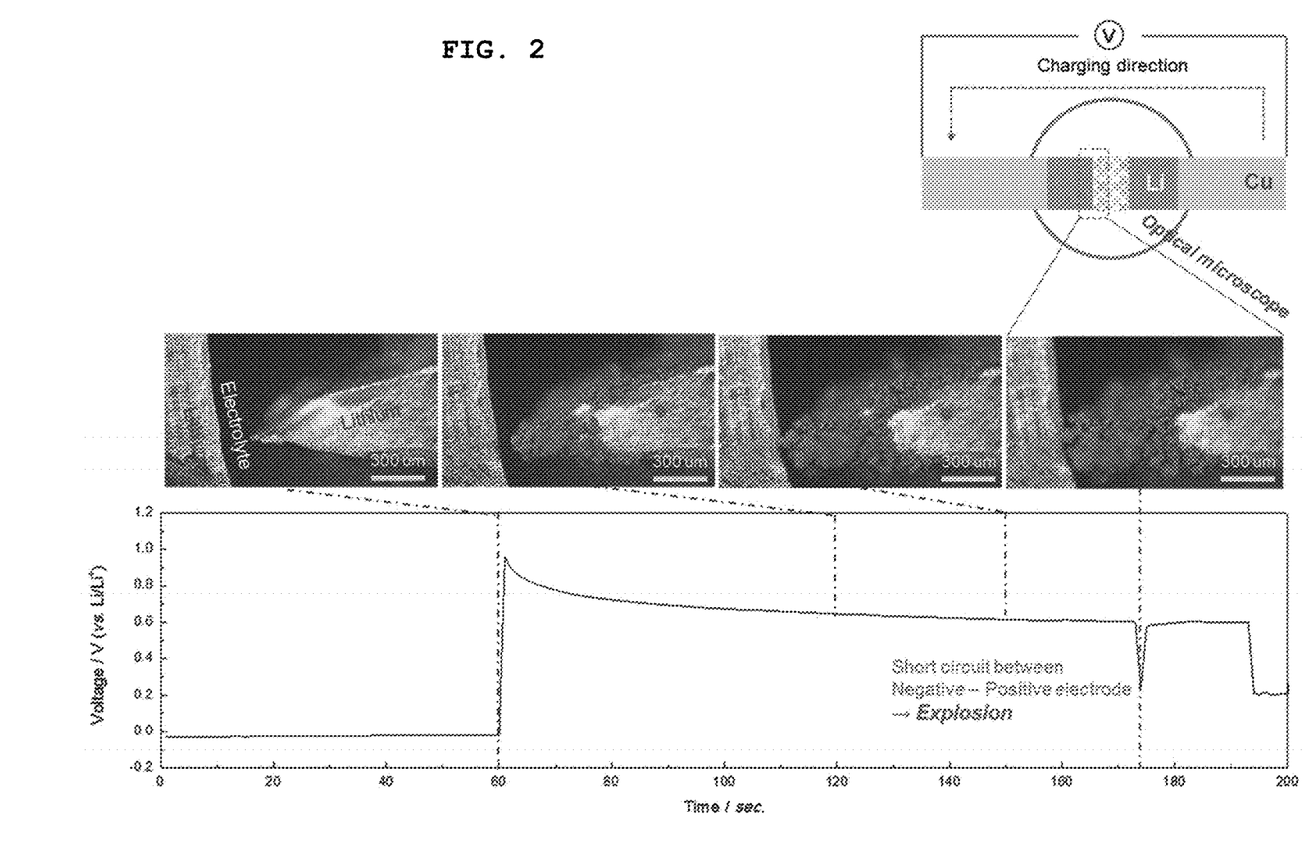
FIG. 2 is a view showing a voltage profile and a lithium deposition image in Comparative Example 1 of the present disclosure.
Figure 3:
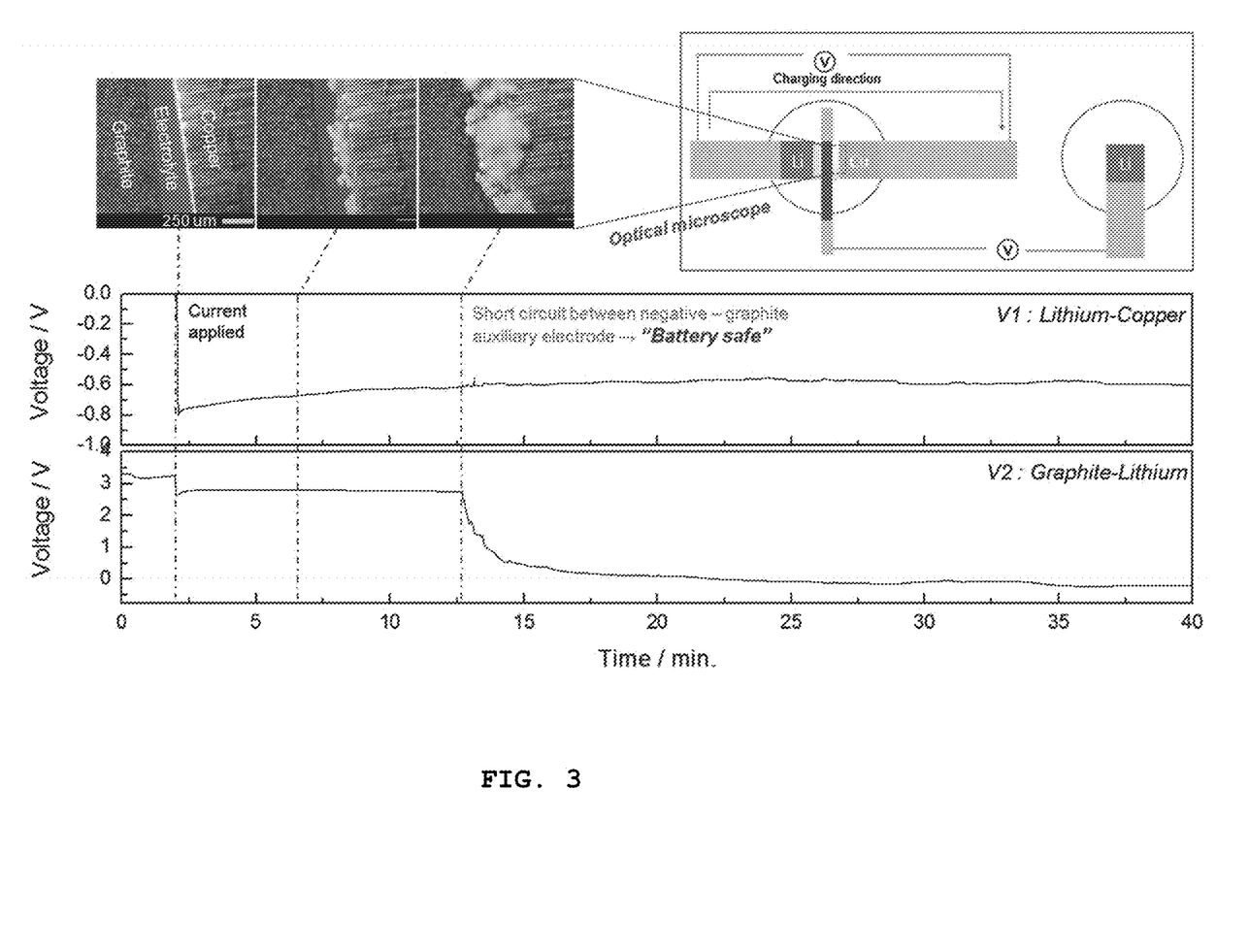
FIG. 3 is a view showing a voltage profile and a lithium deposition image in Example 1 of the present disclosure.

<Experimental Example 1> Measurement of Voltage Change of Graphite Auxiliary Electrode FIGS. 2 and 3 show the results of analyzing voltage changes and lithium deposition form of the lithium symmetric cells of Comparative Example 1 and Example 1 in real time while charging with a current of 1 mA. In Comparative Example (FIG. 2) in which the auxiliary electrode is absent, lithium deposited on one side is grown, and a voltage drop occurs due to the contacting of lithium on the opposite side. This can cause an explosion of the secondary battery by an internal short circuit. However, when graphite is introduced as an auxiliary electrode between the lithium-lithium (or copper) symmetric cells as in the case of Example 1 (FIG. 3), it is possible to stop the battery from being driven by effectively detecting the danger of lithium dendrite growth in advance.

Figure 1:
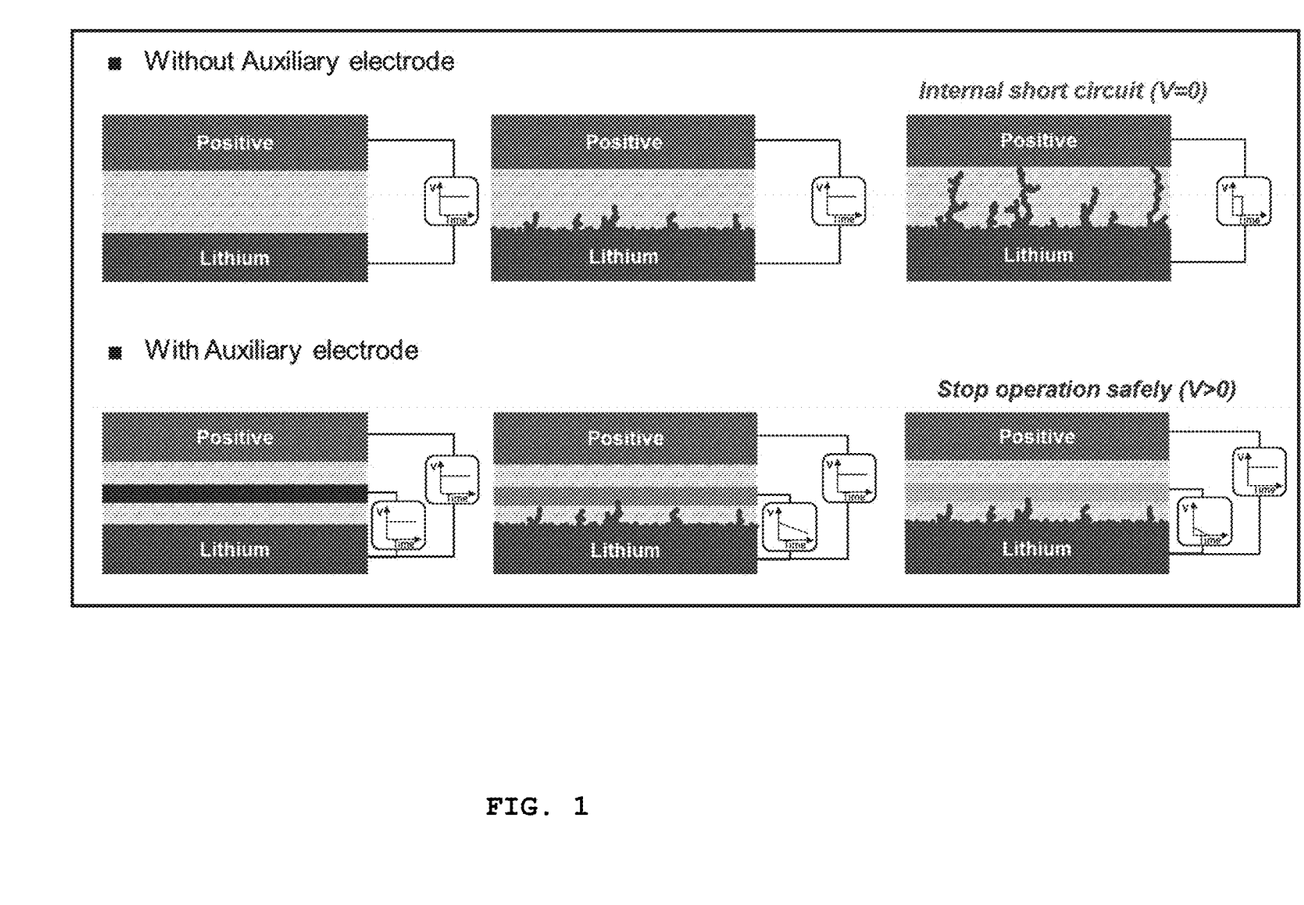
FIG. 1 is a schematic diagram showing an example of pre-detection of dendrite growth according to an embodiment of the present disclosure.

When the grown dendrite as shown in the schematic diagram of FIG. 1 is brought into contact with the graphite auxiliary electrode, the insertion of lithium ions into the graphite layer is performed using the difference in chemical potential of lithium as a driving force. Since graphite itself has the property of being capable of storing lithium ions, the grown lithium dendrite cannot grow anymore towards an opposite electrode and continuously intercalates into the graphite layer. The thermodynamic energy of the graphite layer changes with the intercalation of lithium ions, which is due shown as voltage reduction. The voltage of graphite layer in which the lithium ions are not intercalated is about 3.0 V (vs. Li/Li$^+$) and changes to 0.01 V (vs. Li/Li$^+$) according to the gradual intercalation of lithium ions. At this time, the change in the graphite voltage causes a voltage change that is larger than the voltage change in the lithium symmetric cell, so it is much easier to distinguish than identifying the voltage of the symmetric cell.

The voltage profile shown in FIG. 2 is obtained by measuring the voltage of the cathode-anode of the lithium symmetric cell having no auxiliary electrode. Even if an internal short circuit occurs, a momentary voltage fluctuation occurs, but as shown, it is difficult to identify precisely. On the other hand, when the voltage of the graphite (auxiliary electrode) of FIG. 3 is measured, it can be easily distinguished because it causes a sudden voltage change according to the intercalation of lithium ions. As the voltage of the graphite (auxiliary electrode) drops, it is possible to detect the danger of the battery due to dendrite growth, so it was confirmed that it is possible to stop the battery safely before causing an internal short circuit.

<Example 2> Preparation of Lithium Coin Cell Including Auxiliary Electrode

A lithium metal foil (Hohsen, Japan) having a thickness of 300 μm and copper having a thickness 20 μm was used as an anode and cathode, respectfully; and a donut ring of Teflon material having a thickness of 200 μm was inserted together in order to position the graphite auxiliary electrode between the cathode and anode to configure a coin cell. The graphite used in the auxiliary electrode was mixed with polyvinylidene fluoride-hexafluoropropylene (PVDF-HFP) in a weight ratio of 7:3 via a N-methyl-2-pyrrolidone (NMP) solvent and then prepared in sheet form having a thickness of about 15 µm to 30 µm to prepare the lithium coin cell.

<Comparative Example 2> Preparation of Lithium Coin Cell

In Comparative Example 2, a lithium coin cell was prepared in the same manner as in Example 2, except that the graphite auxiliary electrode was not used.

Figure 4:
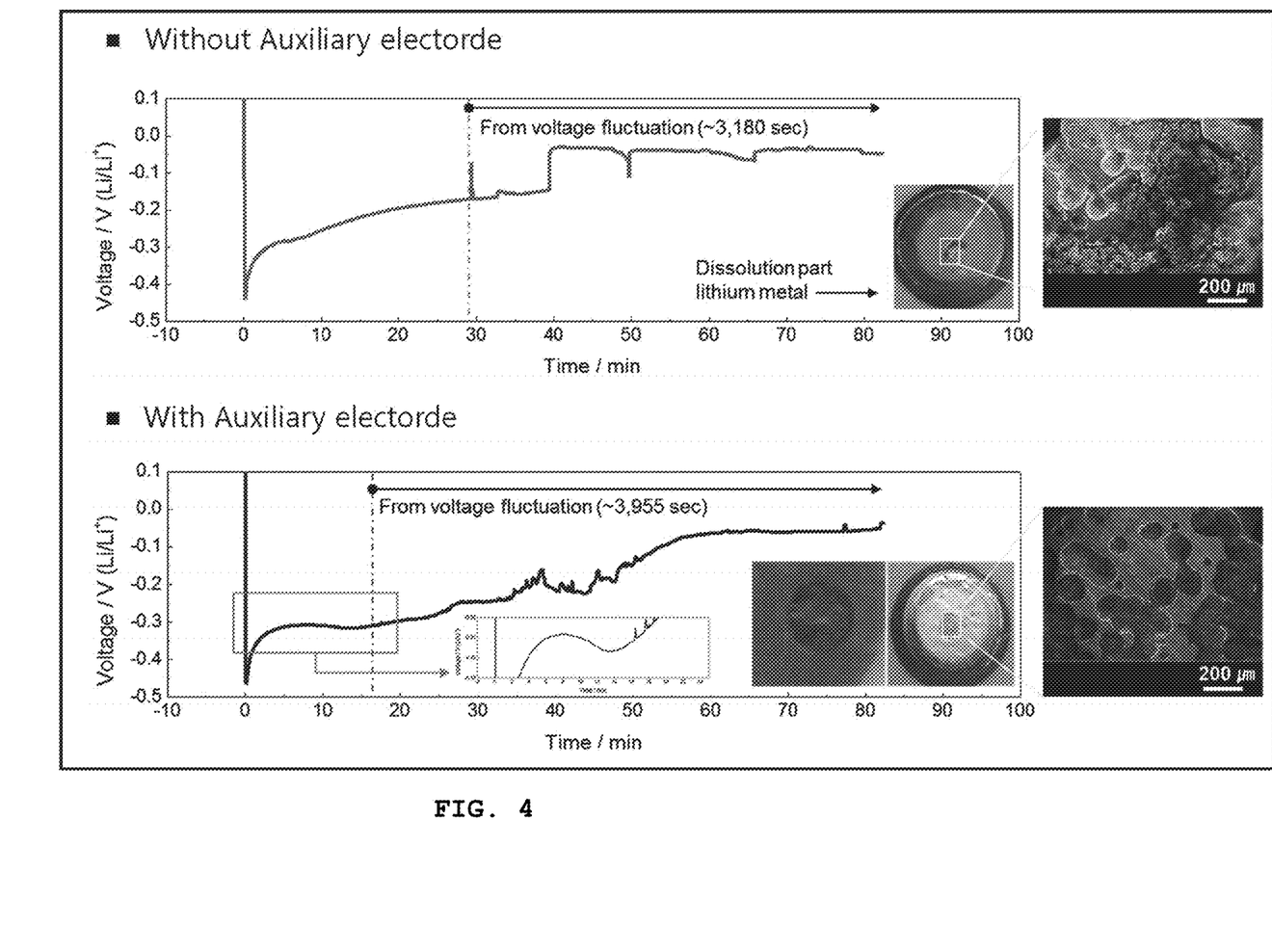
FIG. 4 is a view showing a cathode-anode voltage profile in a coin cell of Comparative Example 2 and Example 1 of the present disclosure and an image after the coin cell is disassembled.

<Experimental Example 2> Cathode-Anode Voltage Profile and Electrode Surface Analysis in Lithium Coin Cell FIG. 4 shows voltage changes occurring when the coin cell prepared in Example 2 and Comparative Example 2 was discharged at a current of 1 mA/cm² for about 80 minutes. In the case of Comparative Example 2 having no auxiliary electrode, the voltage fluctuation occurred after about 29 minutes, and in the case of Example 2 with the auxiliary electrode, it occurred after about 17 minutes. The reason for the faster voltage fluctuation in the presence of the auxiliary electrode is that the grown dendrite contacts the graphite auxiliary electrode located in the middle of the anode and cathode. After the voltage fluctuation, the current was continuously applied so that the dendrite could grow sufficiently. Then, the two cells were dissembled to analyze the lithium surface where the lithium ion dissolution took place, with an electron microscope. In the case of Comparative Example 2 in which the auxiliary electrode is not provided, a deposited form of lithium shape observed as a trace of an internal short circuit was shown on the surface of the electrode where the lithium ion dissolution took place. On the other hand, in the case of Example 2 in which the auxiliary electrode is provided, only a porous form caused by the absence of the lithium ions due to lithium ion dissolution was observed on the lithium metal surface. Further, in Example 2, it can be seen that the color of the graphite used as the auxiliary electrode changed from a black color (discharge phase) to a yellow color (charge phase), and this indicates that a lithium dendrite was not able to grow anymore over the graphite layer and intercalation to the graphite layer occurred.

Figure 5:
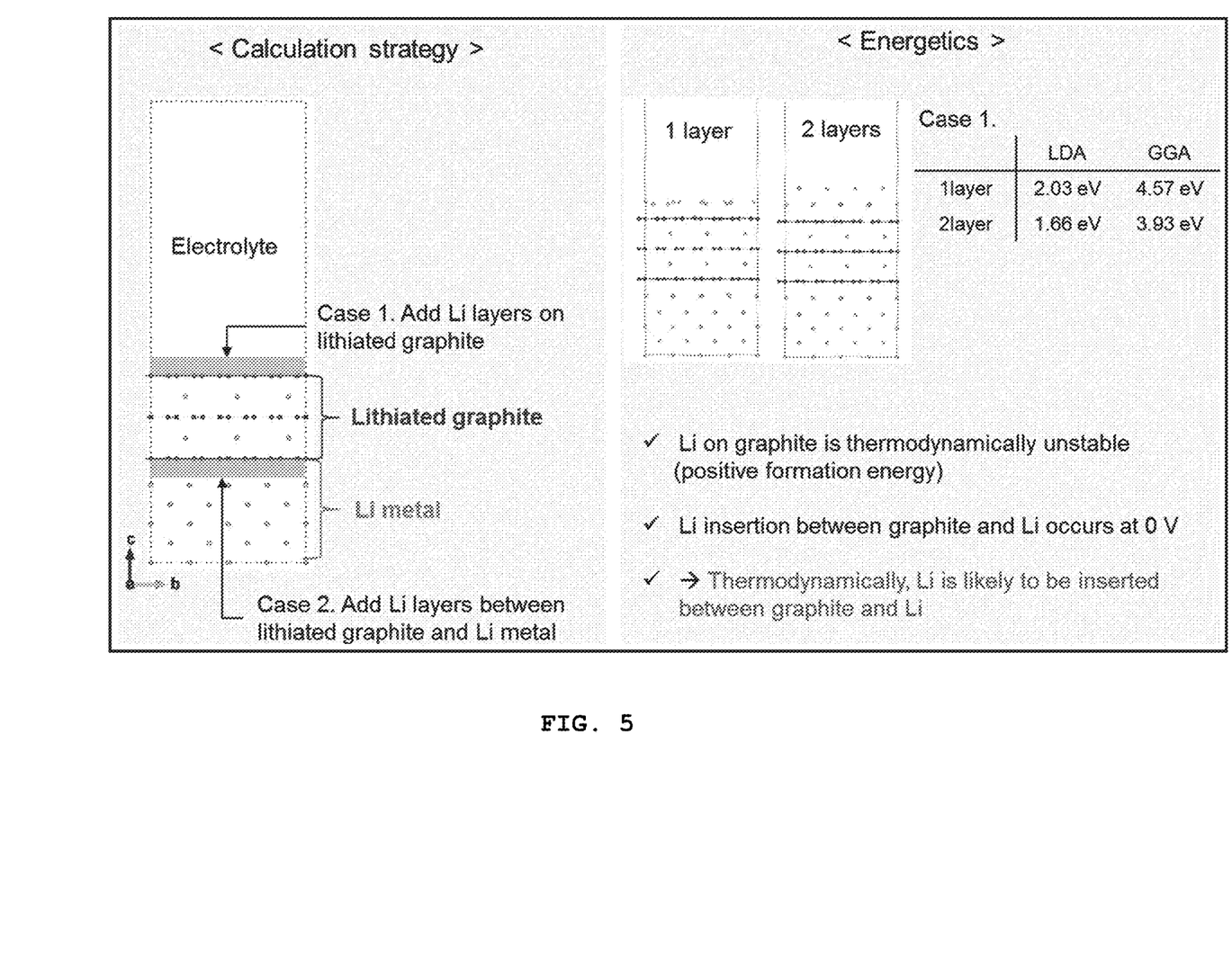
FIG. 5 is a graph showing the results of calculation of deposition positions of lithium ions in Example 3 of the present disclosure.

<Experimental Example 3> Lithium Ion Deposition Position Calculation after Lithium Intercalation of Auxiliary Electrode First principle calculation was used to calculate the position of lithium ion deposition after the auxiliary electrode was fully charged. By a simulation of when the lithium dendrite grows to come in contact with the graphite layer, the charged graphite layer ($Li_6C$) was positioned on the lithium metal as shown in FIG. 5. At this time, the position where lithium ions can be deposited may be two cases as described below.
A. Charged graphite layer surface
B. Between lithium metal and charged graphite layer
For both cases, both Local Density Approximation (LDA) and Generalized Gradient Approximation (GGA) calculations were used for calculating. As a result, in the case of A, in both calculations values higher than 0 eV (LDA 2.03 eV/GGA 4.52 eV) were calculated, which indicates that the deposition of lithium onto the thermodynamically charged graphite layer is unstable.

On the other hand, in the case of B, since lithium is deposited on the surface of lithium metal, in both calculations 0 eV were calculated. This indicates that it is more advantageous for deposition of lithium ions compared to the case A above. That is, after the grown lithium dendrite comes into contact with the graphite layer, lithium ions are generated for the graphite, and even when the graphite layer is fully charged, lithium deposition is continued below the graphite layer without the dendrite having to grow to the opposite electrode, and so it was confirmed that dendrite growth does not occur anymore.

<Experimental Example 4> Analysis of Lithium Ion Storage Capacity According to Auxiliary Electrode Thickness A lithium metal having a thickness of 300 µm and the auxiliary electrode used in Example 2 were respectively used as an anode and cathode and the electrolyte of Example 2 was used to provide a lithium secondary battery. Then, the lithium secondary battery was discharged to 0.01 V at a current density of 10 mA/g and its capacity was measured.

Figure 6:
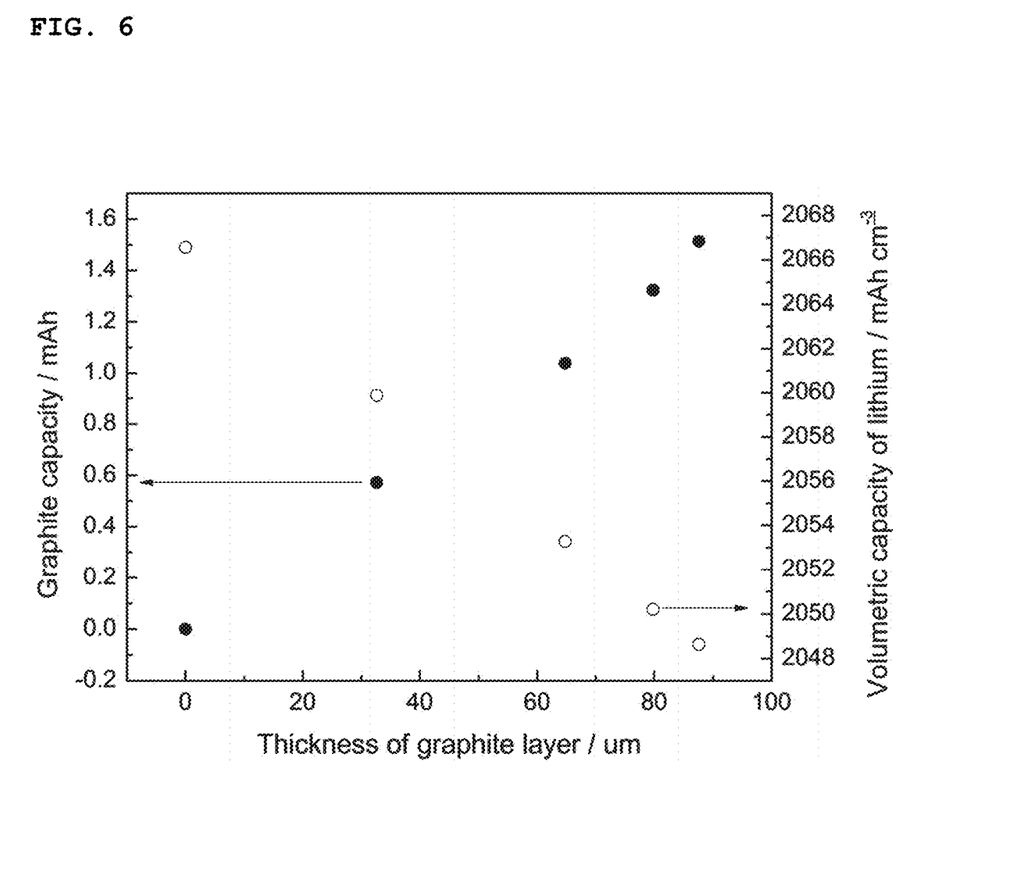
FIG. 6 is a graph showing changes in lithium ion storage capacity and lithium electrode energy density according to the thickness of a graphite auxiliary electrode in Example 4 of the present disclosure.

FIG. 6 shows the storage capacity of lithium ions and the energy density of lithium metal according to the thickness of the auxiliary electrode. As the amount of graphite increases, the ability to accommodate lithium ions increases. However, the energy density of the lithium metal due to the insertion of the auxiliary electrode is reduced. Therefore, it should be noted that both parts must be considered to design the battery.

Although the exemplary embodiments of secondary battery containing an auxiliary electrode sensor and an anomaly detection method for a secondary battery according to an aspect of the present disclosure have been described above, it is apparent that various modifications can be made without departing from the scope of the present disclosure.

Therefore, the scope of the present invention should not be limited to the embodiments described, but should be determined by the scope of the appended claims and equivalents thereof.

That is, it is to be understood that the foregoing embodiments are illustrative and not restrictive in all respects and that the scope of the present disclosure is indicated by the appended claims rather than the foregoing description, and all changes or modifications derived from the equivalents thereof should be construed as being included within the scope of the present invention.

What is claimed is:
1. A secondary battery comprising,
an anode including a metal; a cathode; an electrolyte provided between the anode and the cathode; and a separator membrane, and further comprising,
an auxiliary electrode interposed in the separator membrane, wherein a material of the auxiliary electrode comprises, one or more selected from a group consisting of graphite, graphene, carbon nanotubes, hard carbon, soft carbon, active carbon, carbon black, carbon fiber, and fullerene.
2. The secondary battery of claim 1, wherein the auxiliary electrode is formed of a polymer and an auxiliary electrode material at a weight ratio in a range of 4:6 to 3:7.
3. The secondary battery of claim 1, wherein the separator membrane is configured to have, the auxiliary electrode interposed between a plurality of separator membrane layers that are spaced apart from each other.

4. The secondary battery of claim 1, wherein the anode comprises, one or more metals selected from a group consisting of lithium, sodium, potassium, magnesium, and zinc.

5. The secondary battery of claim 1, wherein the separator membrane comprises, one or more polymers selected from a group consisting of poly(vinylidene fluoride-co-hexafluoropropylene) (PVDF-HFP), poly(vinylidene fluoride) (PVDF), polytetrafluoroethylene (PTFE), poly(methylmethacrylate) (PMMA), poly(acrylonitrile) (PAN), polyethylene (PE), and polypropylene (PP).

6. The secondary battery of claim 1, wherein growth of the metal is inhibited when a dendrite of the metal grows and comes into contact with the auxiliary electrode.

7. The secondary battery of claim 1, wherein the metal is inserted into the auxiliary electrode when a dendrite of the metal grows and comes into contact with the auxiliary electrode.

8. The secondary battery of claim 1, wherein the secondary battery is electrically connected to the anode and the auxiliary electrode and further comprises a means for detecting a voltage between the anode and the auxiliary electrode.

9. A secondary battery anomaly detection method comprising,
   analyzing a state of the secondary battery,
      by using a means connected to the secondary battery, the anode, and auxiliary electrode for detecting a voltage between the anode and the auxiliary electrode of claim 1,
   to collect data for voltage change between the anode and auxiliary electrode when the secondary battery is driven to compare with preset data.

10. The method of claim 9, wherein, the use of the secondary battery is stopped when a voltage between the anode and the auxiliary electrode is 0.01 V or less.

* * * * *